United States Patent [19]
Skelhorn

[11] Patent Number: 6,153,670
[45] Date of Patent: Nov. 28, 2000

[54] GRANULE FOR A THERMOPLASTIC END PRODUCT COMPRISING A MINERAL AND/OR A COLORANT PIGMENT SYSTEM

[75] Inventor: David A. Skelhorn, Alpharetta, Ga.

[73] Assignee: Imerys Pigments, Inc., Roswell, Ga.

[21] Appl. No.: 09/054,132

[22] Filed: Apr. 2, 1998

Related U.S. Application Data

[63] Continuation-in-part of application No. 08/639,309, Apr. 25, 1996, Pat. No. 5,744,530, and application No. 08/988,757, Dec. 11, 1997.
[60] Provisional application No. 60/068,992, Dec. 29, 1997, and provisional application No. 60/070,808, Jan. 8, 1998.
[51] Int. Cl.$^7$ .............................. C08K 9/10; C08K 9/12
[52] U.S. Cl. ........................ 523/210; 523/211; 524/425
[58] Field of Search ............................ 524/425; 523/210, 523/211

[56] References Cited

U.S. PATENT DOCUMENTS

| | | | |
|---|---|---|---|
| 4,455,344 | 6/1984 | Matsuyama et al. | 428/327 |
| 4,803,231 | 2/1989 | Seinera et al. | 523/219 |
| 4,898,620 | 2/1990 | Rayfield et al. | 106/464 |
| 5,744,530 | 4/1998 | Skelhorn | 524/427 |

FOREIGN PATENT DOCUMENTS

2016447   5/1990   Canada .

*Primary Examiner*—James J. Seidleck
*Assistant Examiner*—U. K. Rajguru
*Attorney, Agent, or Firm*—Finnegan, Henderson, Farabow, Garrett & Dunner, L.L.P.

[57] ABSTRACT

A granule containing a high proportion of a mineral filler and a colorant pigment system in a thermoplastic binder, for blending with an end product thermoplastic in which the mineral filler and the colorant pigment is to be dispersed. The granule comprises 85% to 92% by weight of the granule of mineral particles, which is coated with one or more fatty acids having a carbon chain length of from 12 to 20 carbon atoms and the colorant pigment. The colorant pigment may be inorganic or organic or a mixture thereof. The balance of the granule by weight comprises a thermoplastic polymeric binder. The particle size distribution of both the mineral and the colorant particles is in accordance with the optimum particle packing equation to optimize packing of the particles in the granule. The ratio of mineral to colorant pigment to binder may be about 75:15:10 or about 0.1:89.9:10. The invention includes a granule with only a colorant pigment system.

19 Claims, 3 Drawing Sheets

GRANULE FOR A THERMOPLASTIC END PRODUCT COMPRISING A MINERAL AND/OR A COLORANT PIGMENT SYSTEM

This Is A Continuation-In-Part of U.S. Ser. No. 08/639,309 Filed on Apr. 25, 1996 now U.S. Pat. No. 5,744,530 and U.S. Ser. No. 08/988,757 Filed on Dec. 11, 1997. This Application claims The Benefits of U.S. Provisional Application Ser. No. 60/068,992 Filed on Dec. 29, 1997 and on U.S. Provisional Application Ser. No. 60/070,808 Filed on Jan. 8, 1998.

FIELD OF THE INVENTON

This invention relates to fillers generally mixed with thermoplastics, and more specifically relates to a granule or pellet containing a high proportion of a combination of a particulate mineral filler and a colorant pigment system in a thermoplastic binder or a high proportion of a colorant pigment system in a thermoplastic binder for blending with an end product thermoplastic in which the mineral filler and/or the colorant pigment system are to be dispersed.

BACKGROUND OF THE INVENTION

The present invention relates to a particulate product form such as a granule comprising a high concentration of a colorant pigment system or a combination of an inorganic material, such as calcium carbonate, and a colorant pigment system, which may be organic or inorganic, or a mixture of both, and which granule may be blended with a thermoplastic polymer, such as polyolefin to produce a final thermoplastic end product. The blend produced will result in a homogenous composite after being processed using conventional methods such as blow molding, injection molding, and extrusion to produce a final thermoplastic end product. The invention allows both an inorganic filler material and a colorant pigment system to be internally formed into a granule which is used directly in thermoplastics without the need for a separate mixing process. The invention provides a means of achieving high concentrations of inorganic filler material and at the same time add a colorant pigment system to the thermoplastics thereby reducing the number of additives which are generally added separately to the thermoplastic feed for the thermoplastic process.

The thermoplastic processing industry has used inorganic filler materials and optionally a particulate colorant system as additives for thermoplastic resins. Generally these filler materials and colorant pigment system are added separately to the thermoplastic feed. Introduction of the inorganic materials into the polymer has traditionally been achieved using a number of techniques, including those described below.

a) The polymer, inorganic filler material and other additives may be subjected to intensive mixing using mechanical systems designed to disperse the inorganic filler material and additives in the polymer at a temperature above the melting point of the polymer. The proportion of inorganic filler material and additives in the mixture of polymer, inorganic filler material and additives is the same as that required in the final product. Suitable mixing equipment includes internal mixers of the Banbury type, twin or single screw extruders and continuous or batch compounders. Once the inorganic filler material has been dispersed, the melted mixture must be converted into a particulate product form such as granules which will facilitate subsequent processing, e.g. injection molding or extrusion.

b) The polymer, inorganic filler material and other additives are mixed in a similar way to that described above, except that the inorganic filler material is first surface treated with a hydrophobic material to render it compatible with organic polymers. Examples of such hydrophobic materials include carboxylic acids of moderate to high molecular weight such as butyric, lauric, oleic and stearic acid, organosilane coupling agents, organotitanates and zircoaluminates. The proportion of inorganic filler material and other additives in the mixture of polymer, inorganic filler material and additives is much higher than is required in the final product. Inorganic filler material concentrations in the order of 75 to 80 weight percent may be produced using this technique. Mixtures with inorganic filler material contents above this level become both difficult to produce and difficult to redisperse in subsequent processing steps. The final particulate product (e.g. granules) is blended with unfilled thermoplastic polymer immediately prior to entering the final processing operation in such a ratio as to produce a mixture with a lower inorganic filler material which is uniformly distributed and dispersed throughout the system.

c) Highly concentrated, redispersible inorganic filler material compositions are described in U.S. Pat. No. 4,803,231 which have inorganic filler material contents in excess of the 75 to 80% by weight achievable using conventional methods. This patent describes a composition which contains three components: (1) a polyolefin polymer or blend of polymers between 19.99 and 4.05 percent of the composition; (2) 80 to 95 percent inorganic material; and (3) an agent which renders the mixture fluid (a fluidifacient) included at 0.01 to 0.95 percent. This fluidifacient is described as an orthophosphoric acid ester with the general formula:

Where A represents ethylene oxide, B represents propylene oxide, 0<(m+n)<24, R represents an alkyl group (which may be linear or nonlinear, and may be saturated or unsaturated), an aryl group, or a heterocycle (which may be saturated or unsaturated), wherewith said alkyl, aryl or heterocycle group has 5–28 C atoms, preferably 8–24 C atoms, or R is a steroid group; wherewith further the group R may be branched or unbranched and/or may have one or more functional groups, for example, Halogen, —OH, —COOH, —COOR, —NO$_2$, —NH$_2$, —CONH$_2$, —CN or OPO$_3$H$_2$, AND R' may be hydrogen, a carbon chain having 1–4 C atoms, or a group R as defined supra. Thus it is possible that the group R' is identical to the group R.

This composition may be blended with unfilled polymer prior to entering the final processing operation in such a ratio as to produce a mixture with a lower inorganic filler material content which is uniformly distributed and dispersed throughout the system. The resultant mixture contains a reduced level of the polyolefin polymer used for preparation of the concentrate as a result of the increased concentration of inorganic filler material. In discussing this invention in the common assignee's Canadian Patent Application No. 2016447 (the discussion is of equivalent patent EP 0 203 017) it is observed that although a theoretical level of filler of up to 95 percent is disclosed, a practical limit is only 88% by weight of calcium carbonate. In addition, the use of relatively toxic phosphate esters limits the applicability of this system to non-food contact systems.

d) European Patent Application No. 0355808 describes the use of a mixture of a fatty acid salt in combination with a fatty acid amide in the ratios between 10:90 and 90:10 as a coating for calcium carbonate to reduce the surface tension of the inorganic material surface. This coating was also evaluated as a replacement for the orthophosphate ester described in U.S. Pat. No. 4,803,231 (described above) with a view to producing a redispersible composite.

The aforementioned Canadian Patent Application No. 2016447 describes a process used to produce a redispersible composite which uses a volatile solvent to prepare the product. This solvent and moisture are eliminated, leaving an inorganic material containing a hydrophobic coating in a hydrophobic binding agent. The composition of this product after elimination of solvent and dispersing agent is claimed to be 92.1–96.1% inorganic material, 0.1–3.0% of a hydrophobic surface coating agent and 3.8–4.9% of a hydrophobic binder system. This product may be added directly to thermoplastic systems in such proportion as is required by the final formulation. The reduced binder content allows addition to flame retardant polymer systems without adversely influencing flame retardancy. The volatilization step used in this process tends to introduce undesirable complexity and costs.

The fillers which may be mineral are added to the host thermoplastic during thermoplastic processing systems such as injection, blow molding, or extrusion. Optimum levels of the fillers range from 10 to 25 weight percent based on the weight of the host thermoplastic, dependent on application, i.e. the final form of the final thermoplastic end product.

The above prior art relates to the use of high binder contents which is introduced into the final polymer composition; or to the use of dispersion or fluidifacient additives or agents which allow a highly concentrated inorganic filler material composite to be produced which will redisperse with ease in thermoplastic polymers. If a colorant pigment system is desired in the final polymer composition, then generally, it is added as a separate additive to the polymer composition.

SUMMARY OF INVENTION

Now in accordance with the present invention, a granule is provided containing a high proportion of a particulate mineral filler, preferably carbonate and more preferably calcium carbonate, and/or a colorant pigment system in a thermoplastic binder, for blending with an end product thermoplastic in which the mineral filler and/or the colorant system is to be dispersed. The granule comprises at least 85% (and preferably 85 to 92%) by weight of a) particulate mineral which may be coated with a fatty acid or blend of fatty acids having a carbon chain length of from 12 to 20 carbon atoms, and/or b) a colorant pigment system. Also included is a thermoplastic polymeric binder which is solid at ambient temperature and integrally forms the colorant pigment or the particulate mineral filler with the colorant pigment into the granule. The binder is compatible with the end product thermoplastic in which the mineral filler and/or the colorant pigment system are to be dispersed. The polymeric binder is selected from one or more members of the group consisting of amorphous polyolefins and highly branched polyethylene waxes.

The colorant pigment system may comprise particles which are organic, inorganic, or a mixture of both. If inorganic, it may be selected from the group consisting of titanium dioxides, cadmium sulfoselenides, cadmium mercury, natural and synthetic iron oxides, ultramarine violet, manganese violet, cobalt violet, cadmium sulphides, lead chromates, calcimed metallic oxides, ferriferrocyanides, ultramarine blues, chrome orange, lead molybdate oranges, chromium oxides, hydrated chromium oxides, chrome greens, and ultramarine greens. If organic, the colorant pigment may be selected from the group consisting of chinaphtalones, monoazo calcium toners, disazocondensation products, diarylide yellows, isoindolinones, monoazo products, disazo products, benzimidazolones, anthrachinones, disazopyrazolones, perinones, monoazonaphthol AS, disazocondensation products, perylenes, B-naphthol, chinachridones, thioindigo's, dioxazines, indathrones, and phthalocyanine compounds.

The particulates in the granule are such that they maximize the particle packing characteristics in that the particle size distribution of the particulates, whether mineral and/or colorant pigments, is in accordance with the equation:

$$\text{Cumulative Percent finer than } D = \frac{(D^n - D_s^n)}{D_L^n - D_s^n} \times 100\% \qquad (1)$$

where
 D=Particle size
 $D_s$=Smallest particle size—selected
 $D_L$=Largest particle size—selected
 n=Distribution modulus;
For the particulates in the granule, whether being both the mineral and the colorant pigments or only the colorant pigments, the $D_L$ should be in the range of 100 to 1.0 um; $D_s$ in the range of 10 to 0.01 um; and n is accorded a value appropriate for particles assumed to be approximately spherical. Preferably $D_L$ is in the range of 44 to 2 um, $D_s$ is in the range of 0.5 to 0.1 um, and n is about 0.37.

It is therefore an object of the present invention to provide a thermoplastic granule having a high solids concentrate of a mineral filler and/or a particulate colorant pigment system with the particle size distribution of the particulates in the granule closely meeting that of the optimum particle packing equation. If the colorant concentrates in the granule are inorganic, the particle size distribution may or may not be such as to complement the particle size distribution necessary to provide efficient particle packing according to the above equation.

It is a further object of the invention to provide a granule for use as a filler in a thermoplastic end product which granule comprises a mineral filler and/or a colorant pigment system.

These and other objects and advantages of the present invention will be better understood and appreciated by reference to the following detailed description when considered in connection with the accompanying drawings:

DETAILED DESCRIPTION OF THE PREFERRED EMBODIMENTS

The granule of the invention can be prepared similar to those examples found in co-pending non-provisional patent applications bearing U.S. Ser. No. 08/639,309 and U.S. Ser. No. 08/988,757 filed on Dec. 11, 1997 and provisional patent applications Ser. No. 60/068,992 filed Dec. 29, 1997 and Jan. 8, 1998 and U.S. Ser. No. 08/639,309, the disclosures of which is incorporated herein by reference. The term "granule" as used herein is intended to refer to the individual discrete components which in total comprise a particulate which as such is in use blended with the aforementioned end product thermoplastic. These discrete components can have irregular surface characteristics as commonly results from granulation, or can have smooth continuous surfaces as a result of pelletization. Both of these discrete types of assemblages are intended to be encompassed herein by the term "granule."

If the mineral used in the granule of the invention is a carbonate, it may be an alkaline earth metal carbonate, such as calcium carbonate, dolomite, magnesite or strontium carbonate, and is preferably a ground or chemically precipitated calcium carbonate or a mixture of ground and precipitated calcium carbonates. In many applications a ground marble is found to be particularly advantageous.

The colorant pigment system used in the granule of the invention is a colorant pigment which may be an organic particle or an inorganic particle or a blend thereof. If the particle of the colorant pigment system is organic, it may be selected from the group consisting of titanium dioxides, cadmium sulfoselenides, cadmium mercury, natural and synthetic iron oxides, ultramarine violet, manganese violet, cobalt violet, cadmium sulphides, lead chromates, calcimed metallic oxides, ferriferrocyanides, ultramarine blues, chrome orange, lead molybdate oranges, chromium oxides, hydrated chromium oxides, chrome greens, and ultramarine greens. If organic, the colorant pigment may be selected from the group consisting of chinaphtalones, monoazo calcium toners, disazocondensation products, diarylide yellows, isoindolinones, monoazo products, disazo products, benzimidazolones, anthrachinones, disazopyrazolones, perinones, monoazonaphthol AS, disazocondensation products, perylenes, B-naphthol, chinachridones, thioindigo's, dioxazines, indathrones, and phthalocyanine compounds. Other classes of colorants may also be used.

The ratio of mineral:colorant system:binder may be 75:15:10% by weight of the granule. In some applications, the granule may have a ratio of mineral:colorant system:binder going to 0:90:10 where the mineral content reaches zero and the colorant pigment system content extends to about 90% by weight of the granule. The colorant pigment system may range from at least 0.1% to about 90%by weight of the granule. If the mineral is carbonate, the method of producing actual particle sizes may be by comminution of naturally occurring carbonate minerals by a dry or a wet process, or by precipitation from an aqueous medium. They may be produced by blending of components having different particle size distributions (PSD's) or from a production process which generates them naturally, more above which is discussed hereinbelow.

The granules involved in the invention would typically be in the size range of from 5 to 10 mesh, and the end product thermoplastic with which the granules are to be blended may comprise granules in the same 5 to 10 mesh range.

The granule of the invention does not require the use of additional chemical materials for its preparation or for its re-dispersion in a thermoplastic composition for the end product. Thus the granules are preferably substantially free of a dispersing or fluidifacient additive, however, in addition to the colorant pigment system, the granules may include any additional functional additives which may be desired in the final thermoplastic formulation.

Preferably, the carbonate mineral of the granule of the invention is coated with fatty acid or blend of fatty acids having a carbon chain length from 12 to 20 atom carbons. The hydrophobic material should be selected to render the surface of the inorganic material surface hydrophobic and compatible with organic polymers. Examples of such hydrophobic materials include carboxylic acids, or their salts, having from 3 to 20 carbon atoms in their hydrocarbon chain such as butyric acid, lauric acid, oleic acid, stearic acid, behenic acid and monthanic acid, organosilane coupling agents, organotitanates and zircoaluminates. Other hydrophobic coating agents may be utilized.

Binders for use in the granule of the invention preferably comprise an amorphous polyolefin or a highly branched polyethylene wax. Typical such binders are polypropylene homopolymers and amorphous copolymers of propylene and ethylene or butylene. It should be appreciated that the binders of the invention differ markedly from conventional prior art binders used in pellets of the present type. These conventional binders are typically polyolefins and polyolefin waxes, which are thereby highly compatible with polyolefin polymers.

The binders for the granules should be chemically and physically compatible with the host or matrix thermoplastic so that the resulting end product is not significantly weakened or discolored by the presence of the binder, and does not exhibit surface bloom from migration of the granule binder to the product surface. Among the amorphous polyolefins utilizable as binders in the granules of the invention are amorphous polypropylene homopolymers. These differ from conventional polypropylenes which are highly crystalline.

The viscosities of useful such amorphous homopolymers (ASTM D3236) are in the range of 1000–2300 cps at 190° C. This translates to a theoretical Melt Flow Index of ca 90,000–40,000 g/10 minutes. Conventional polypropylene and polyethylene polymers have Melt Flow Incides in the range 200 down to 0.1.

Other less preferred grades of such homopolymers for use in the invention have a viscosity of 200 cps at 190° C. (equivalent to 500,000 g/10 minutes MFI). A viscosity of 200 to 20,000 cps is preferred (equivalent to 500,000–5,000 g/10 minutes MFI); a viscosity of 500 to 5,000 cps is more preferred (equivalent to 200,000–15,000 g/10 minutes MFI); and a viscosity of 1,000 to 2,500 cps is most preferred (equivalent to 90,000–35,000 g/10 minutes MFI).

Amorphous copolymers of propylene and ethylene, and mixtures of copolymer with homopolymer are also effective for use in the invention.

The highly branched polyethylene waxes for use in the invention are preferably saturated, non-polar, synthetic hydrocarbon waxes which have been chemically neutralized. The special HULS/VEBA modification of the Ziegler low pressure polymerization of ethylene is typically used to produce the unique characteristics of this group of materials. The process confers branched-chain iso-paraffinic configurations.

The grade particularly preferred for use in the invention has a very high iso-paraffinic (branched) configuration and is predominantly branched chain. A typical such product has 70% branching, a molecular weight of 3,500 (by osmometry), an ASTM D-566 drop point at 102–110° C., density is 0.92, and a viscosity of 150° C. of 300–380 cps.

The granule of the present invention preferably is produced according to the teachings of the aforesaid patent application U.S. Ser. No. 08/639,309 filed Apr. 25, 1996, which is incorporated herein by reference.

An optimized amount of combined mineral particles and/or colorant pigment system is attained by using the Andresean-Furnace equation as follows:

$$\text{Cumulative Percent finer than } D = \frac{(D^n - D_s^n)}{D_L^n - D_s^n} \times 10$$

where

D=Particle Size $D_s$=Smallest Particle Size Selected $D_L$=Largest Particle Size Selected n=Distribution Modulus and has a value appropriate for the particles, i.e. the mineral particles and/or the colorant pigment particles, assumed to be approximately spherical and is about 0.37.

This equation also known as the optimum particle packing equation produces a theoretical curve for a particle size distribution which must be closely met by an actual particle size distribution of the particles in a granule.

This equation for optimum particle packing is well-known to those skilled in the art of particle packing and is discussed in an article entitled "Particle Packing-II Review of Packing of Polydisperse Particle Systems," by D. R. Dinger and J. E. Funk appearing in Intercam Whitewares, Volume 41, No. 3, 1992.

An example of the manner in which this equation is applied for a particle size distribution can be appreciated from the following:

If $D_s$ is 0.35 microns and DL is 18 micron and if D is selected at frequent points between 0.35 microns and 18 microns, e.g. 0.3, 0.5, 0.7, 1.0, 2.0, 4.0, 6.0, 8.0, 10.0, 12.0, 14.0, and 18.0 microns, then by use of the Andresean-Furnas equation, the particle size distribution for each of these selected points from 0.35 microns to 18.0 microns for the particles in the granule in equivalent spherical diameter will be as follows:

100 weight percent<18 microns 94.4weight percent<16 microns 88.4 weight percent<14 microns 81.8 weight percent<12 microns 74.5 weight percent<10 microns 66.2 weight percent<8.0 microns 56.6 weight percent<6.0 microns 44.4 weight percent<4.0 microns 27.5 weight percent<2.0 microns 14.4 weight percent<1.0 microns 8.87 weight percent<0.7 microns 4.28 weight percent<0.5 microns 0.0 weight percent<0.35 microns For the point D=6 microns, then 56.47 weight percent of the particles will be less than 6 microns.

Figure 1:
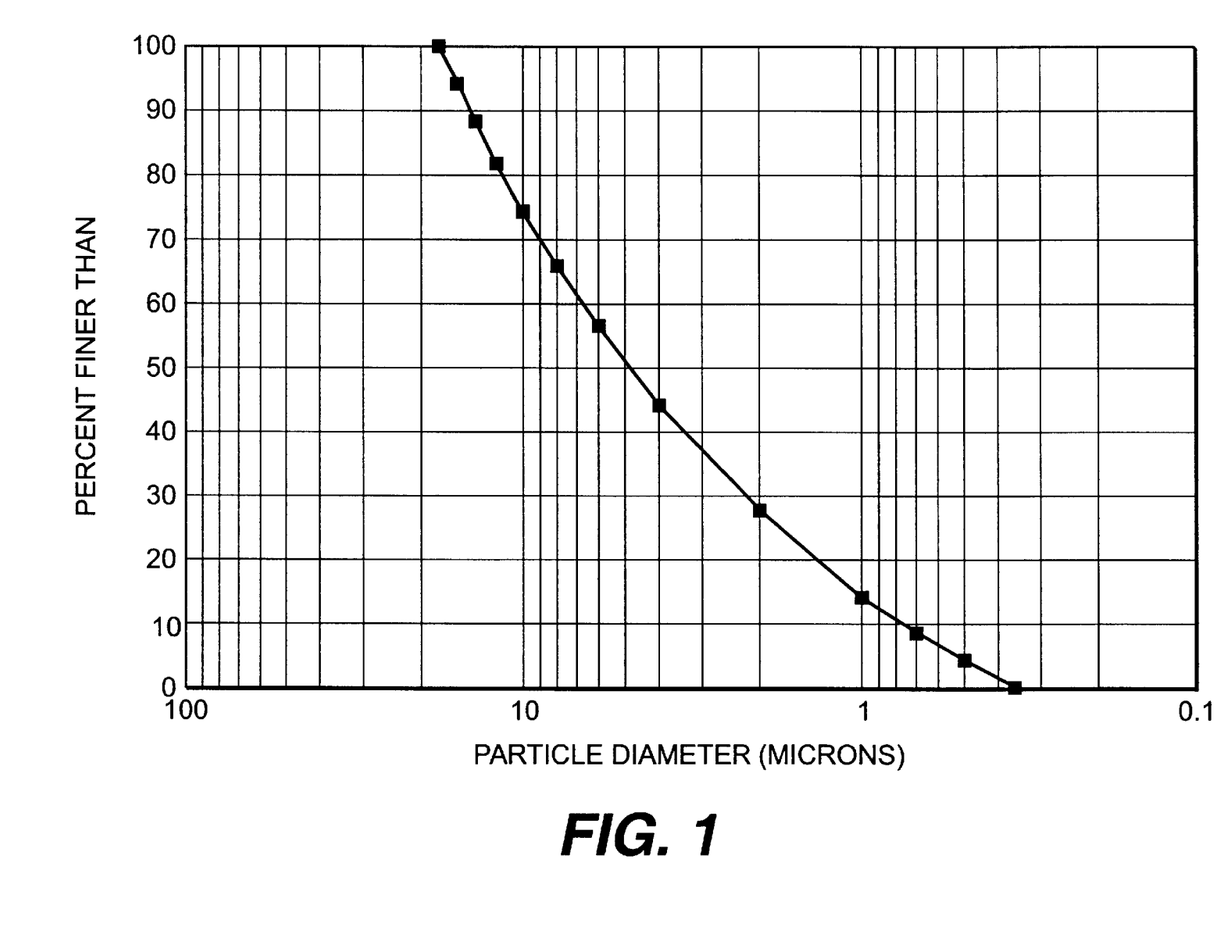
FIG. 1 is a graph showing an example for a theoretical curve based on the optimum particle packing equation.

Plotting these values then along a logarithmic scale will result in FIG. 1. In certain applications, the curve for an actual particle size distribution of the mineral and/or colorant pigment system of the granule of the invention would need to closely meet this theoretical curve.

Those skilled in the manufacturing of a mineral pigment, such as precipitated or ground calcium carbonate are familiar with the manner in which to obtain a particle size distribution for a particular grade of calcium carbonate for a particular application. For example, in order to obtain a particle size distribution of a calcium carbonate manufactured by the assignee of the present application and sold under the name, SNOWFLAKE PE®, which has particular application in glass reinforced thermoset plastics to reduce plastic resin requirement, the following process is undertaken:

Calcium carbonate which has been crushed, washed, and sorted (for color) is introduced with water, in a ratio of approximately 30% mineral and 70% water, into a tube mill. A tube mill is a long cylindrical vessel which is rotated on its longitudinal axis. The output end is partially dammed to retain water and mineral and allows autogenous grinding to occur where the mineral also acts as the grinding medium. This mill is kept partially filled. The mill fill level is controlled by measuring the energy used in the motor which drives the mill. As the power consumption of the motor drops to a predetermined value, additional mineral is allowed to enter the mill periodically. This process established an actual particle size distribution which is in equilibrium and constant and which ranges from 100 microns to 0.4 microns.

For an actual particle size distribution of a mineral there is a top size and a bottom size which closely meets at least part of the theoretical curve of the packing equation of the claimed invention. For example, for the SNOWFLAKE PE® product discussed hereinabove, a top size of 40 microns and a bottom size of 0.4 microns closely meets the criteria given by the particle packing equation. Above 40 microns, the particle size may deviate significantly from the theoretical curve of the packing equation.

In some industrial applications, this larger, coarser type of particle may not be acceptable due to abrasiveness, surface roughness, etc. in the end product. In this instance, the output of the tube mill producing the SNOWFLAKE PE® product may be modified by removal of the fraction above 44 microns. This can be done by passing an aqueous slurry through a vibrating 325 mesh screen which allows the fraction below 44 microns to pass through. This fraction which passes through would still conform to the particle size distribution criteria for the theoretical curve produced by the packing equation of the claimed invention, and the oversize material above 44 microns can be recycled or used as feed for another circuit in the tube mill. By screening (i.e. positive removal of the coarse fraction), a distribution is achieved which is both fine enough for use in plastics and which fully meets the theoretical criteria for packing.

Equivalent calcium carbonate products may be commercially available to the plastic industry from different mineral pigment producers. These producers generally compete in the marketplace on an equal footing and can be produced by entirely different methods. Once a desired distribution is known for a product, the step remaining is identification on how to achieve it. It is well known to those skilled in the pigment industry, the manner in which to obtain desired particle size distribution for a certain pigment product used in a particular application to obtain a desired result in the end product.

Some of the methods known to those skilled in the art for obtaining an actual particle size distribution for a mineral pigment are for example: For wet ground calcium carbonate particles, the methods may include wet grinding in a ball mill; wet grinding in a wet vertical media mill; wet grinding in a wet horizontal media mill; wet classification by means of a wet centrifugal classifier; or wet grinding in an autogenous tube mill. A dry ground calcium carbonate particle can be prepared by conventional grinding and classifying techniques, e.g. jaw crushing followed by roller milling or hammer milling and air classifying. Calcium carbonate can also be precipitated through methods of which are well known to those skilled in the art.

The optimum particle packing equation is used in the invention as a tool to manipulate a particle size distribution for the mineral and/or colorant pigment system for use in a thermoplastic end product. If the mineral and/or colorant pigment system has an actual particle size distribution curve not conforming to the packing equation then the particles, particularly the calcium carbonate, can be screened and/or further processed to attain the required size limits, DL and Ds in order to meet the theoretical curve. Additionally, two or more mineral products and/or colorant particles, i.e. organic or inorganic, can be blended in certain ratios to produce a particle size distribution which would closely meet the theoretical curve of the Andreasen-Furnas Equation. For example, 45% of mineral product can be combined with 30% of a second mineral product and this can be combined with 15% of a colorant to attain a curve closely meeting the theoretical curve of the equation.

The particle packing equation provides a means for gauging whether mineral and/or colorant pigment system can be used for a desired application, and also establishes a suitable particle size distribution which will effectively achieve an optimum particle packing necessary for producing the pellet used in the thermoplastic end product. If the mineral and/or the colorant pigment system do not conform to the particle packing equation then they can be further processed through means known to those skilled in the art so that they do conform.

It is well known to those skilled in the pigment industry the manner in which to obtain a desired particle size distribution for a certain pigment product, such as that used as the colorant pigment system in the invention.

Those skilled in the art of processing a calcium carbonate product or other mineral product or colorant pigments are familiar with those techniques involved for obtaining an actual and desired particle size distribution of a pigment or mineral particle for a particular application. The particle packing equation produces a theoretical particle size distribution which acts as a guideline in providing an optimum particle packing of the calcium carbonate and colorant pigment system in the pellet of the invention. The processed calcium carbonate and colorant particles may or may not have a particle size distribution conforming to the theoretical one represented by the particle packing equation. If the actual particle size distribution of the calcium carbonate and colorant particles does not conform to the theoretical one, then the calcium carbonate and colorant particles may be further processed so that when combined in various ratios, they do conform to the theoretical particle size distribution of the particle packing equation.

The preceding information regarding the optimum particle packing equation and the obtaining of an actual particle size distribution for a particle product is discussed in the aforesaid U.S. patent application U.S. Ser. No. 08/639,309 which discloses and claims a thermoplastic pellet or granule for use in the polymer industry.

The following examples are found in the aforesaid U.S. Ser. No. 08/639,309 for making a thermoplastic granule comprised of calcium carbonate and binder and are illustrative of the manner in which the granule of the present invention, comprised of various proportions of mineral and/or colorant pigments and a binder, can be formed.

Examples 1–4 relate particularly to a thermoplastic granule of recently allowed patent application bearing U.S. Ser. No. 08/639,309.

EXAMPLE 1

Figure 2:
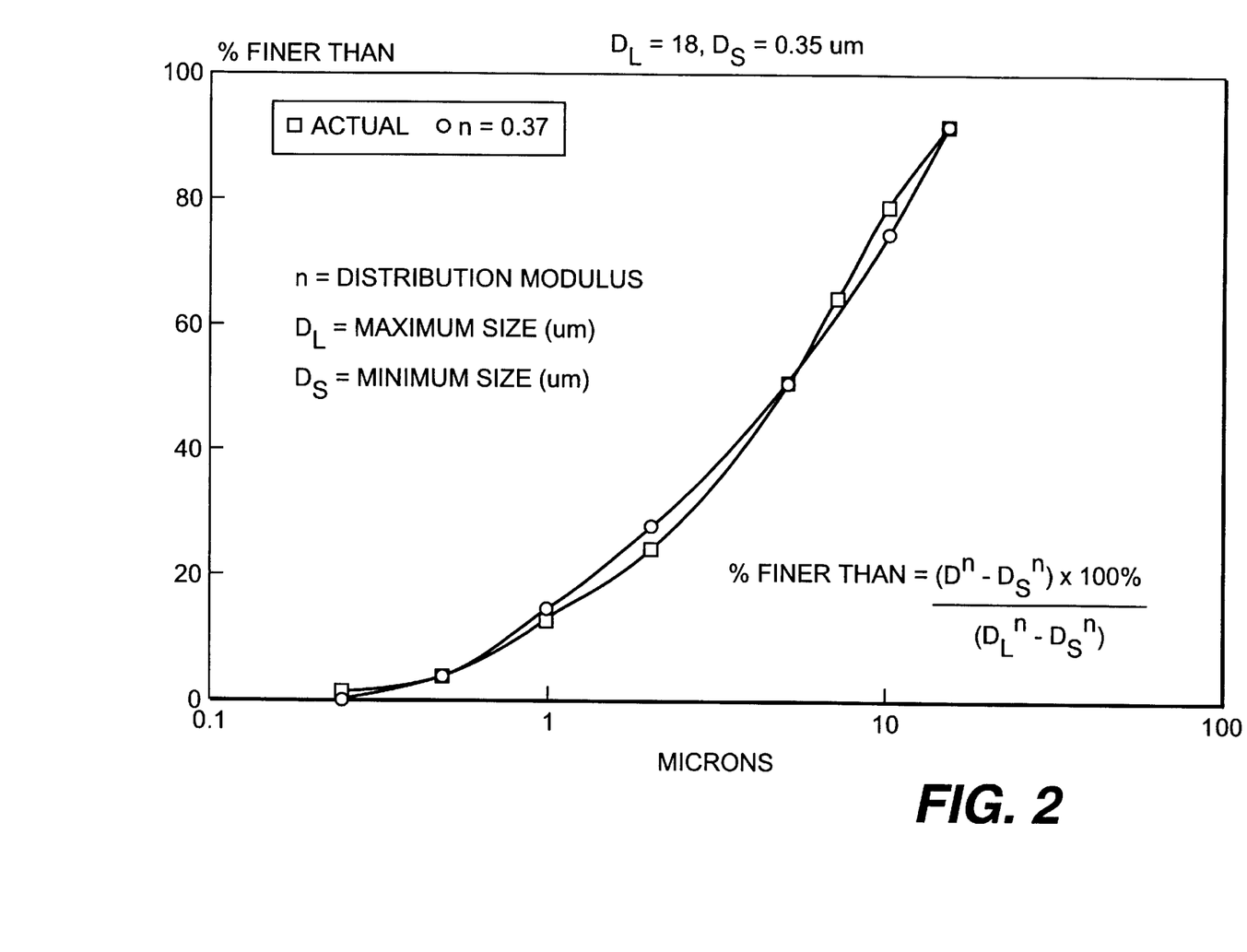
FIG. 2 is a graph showing curves for both an actual particle size distribution and a theoretical particle size distribution of the particle packing equation for $D_L$=18 microns and $D_L$=0.35 microns (Examples 1–4).

Calcium carbonate with a $D_L$ of 18 micrometers and a Ds of 0.35 micrometers (FIG. 2) was treated with 1.0 percent of stearic acid in a high speed mixer running at 4000 rpm for 5 minutes at a temperature of 120 degrees Celsius. This product was then placed in an internal mixer at a temperature of 160° with an amorphous polypropylene homopolymer with a melting point of 152° C. in the ratio of 92:8 of treated calcium carbonate: polypropylene and was kneaded to form a homogeneous mixture. The resultant mixture was formed into granules by passing through a granulator and screening the resultant granules between 5 mesh and 10 mesh screens. The granulated product thus produced was blended with conventional polypropylene homopolymer with a melt flow index of 4.0 in the ratio of 88.9:11.1 polypropylene: granules. The blend was metered into a Kawaguchi reciprocating screw injection molding machine containing a screw with no mixing elements. The very high calcium carbonate-containing granules (92% $CaCO_3$) dispersed readily into the blend and produced visually homogeneous molded parts.

EXAMPLE 2

Calcium carbonate with a $D_L$ of 18 micrometers and a $D_S$ of 0.35 micrometers (FIG. 2) was treated with 1.0 percent of stearic acid in a high speed mixer running at 4000 rpm for 5 minutes at a temperature of 120° C. This product was then placed in an internal mixer at a temperature of 131° C. with a highly branched polyethylene wax with a melting point of 121° C. in the ratio of 92:8 of treated calcium carbonate-:polyethylene wax and was kneaded to form a homogeneous mixture. The resultant mixture was formed into granules by passing through a granulator and screening the resultant granules between 5 mesh and 10 mesh screens. The granulated product thus produced was blended with conventional polypropylene homopolymer with a melt flow index of 4.0 in the ratio of 88.9:11.1 polypropylene:granules. The blend was metered into a Kawaguchi reciprocating screw injection molding machine containing a screw with no mixing elements. The granules dispersed readily into the blend, an d visually homogeneous calcium carbonate filled parts were molded.

EXAMPLE 3

Calcium carbonate with a $D_L$ of 18 micrometers and a $D_S$ of 0.35 micrometers (FIG. 2) was treated with 1.0 percent of stearic acid in a high speed mixer running at 4000 rpm for 5 minutes at a temperature of 150° C. This product was then placed in an internal mixer at a temperature of 160° C. with polypropylene homopolymer in the ratio of 90:10 of treated calcium carbonate:polypropylene and was kneaded to form a homogeneous mixture. The resultant mixture was formed into granules by passing through a granulator and screening the resultant granules between 5 mesh and 10 mesh screens. The granulated product thus produced was blended with linear low density polyethylene with a melt flow index of 50 in the ratio of 88.9:11.1 polyethylene:granules. The blend was metered into an Arburg All-rounder 35 ton reciprocating screw injection molding machine containing a screw with no mixing elements. Homogeneous calcium carbonate filled parts were molded with the desirable properties as disclosed in the aforesaid patent application U.S. Ser. No. 08/639,309 where it was evident that the strength properties of the filled parts had not been substantially reduced. Optical properties were seen to be altered as a result of the addition of the calcium carbonate. The significance of this depends on the contemplated end use.

EXAMPLE 4

Calcium carbonate with a $D_L$ of 18 micrometers and a $D_S$ of 0.35 micrometers (FIG. 2) was treated with a 1.0 percent of stearic acid in a high speed mixer running at 4000 rpm for 5 minutes at a temperature of 150° C. This product was then mixed using a two roll mill at a temperature of 160° C. with a highly branched polyethylene wax in the ratio of 90:10 of treated calcium carbonate:wax to form a homogeneous mixture. The resultant mixture was formed into granules by passing through a granulator and screening the resultant granulate between 5 mesh and 10 mesh screens. The granulated product thus produced was blended with high density polyethylene with a melt flow index of 30 in the ratio of 88.9:11.1 polyethylene:granules. The blend was metered into an Arburg All-rounder 35 ton reciprocating screw injection molding machine containing a screw with no mixing elements. Homogeneous calcium carbonate filled parts were molded with the properties disclosed in patent application U.S. Ser. No. 08/639,309.

EXAMPLES OF THE INVENTION

Samples were made incorporating the teachings of the present invention where a colorant pigment system was added to a granule in addition to calcium carbonate and binder and where the calcium carbonate particles and the colorant particles have a particle size distribution closely meeting that of the optimum particle packing equation.

EXAMPLE 5

Invention

A first sample was prepared. An 85% by weight calcium carbonate with a $D_L$ of 40 microns and a $D_S$ of 0.4 microns was placed in a Brabender mixer. This carbonate was the SNOWFLAKE PE® product (calcium carbonate) discussed earlier which is stearate coated and available under the tradename (SYCX1005). Additionally, 4% by weight of an inorganic blue pigment (colorant pigment), which is available from BASF Co. under the name of BASF Heliogen Blue, and 10% by weight of a binder, which is an amorphous polypropylene homopolymer and which is available from the Eastman Company, under the tradename EASTOFLEX P-1023, were placed into the bowl of the Brabender mixer where the temperature of the bowl was set at 125° C. The blades of the mixer were run at 45 rpm for 5 minutes. Once removed from the mixer, the blend was cooled to 20° C., and the granules were crushed with a hammer and screened through a 5 and 10 mesh screen set. The material that was retained between this 5 and 10 mesh screen set were added to the thermoplastic host material which is available from Himont Company under the tradename Profax 6323 and mixed by hand. The resulting polymer mixture containing the granules with the color pigment system was metered into a Kawaguchi reciprocating screw injection molding machine containing a screw but no mixing elements. The screw of the molding machine was run at 200 rpm. The temperatures and pressures for the molding machine used in Example 5 are shown in Table 1.

EXAMPLE 6

Invention

A further sample was prepared similar to the sample of Example 5. The formula for this second sample was 86% by weight of the SNOWFLAKE PE® product (calcium carbonate) which was stearate coated with SYCX1005, 2% by weight of the BASF Heliogen Blue inorganic pigment (colorant pigment), 10% by weight of EASTOFLEX P-1023 polymer binder, and 2% by weight of titanium dioxide ($T_1O_2$) (colorant pigment). These materials were placed in the Brabender blender with the blades running at 45 rpm for 5 minutes and the bowl temperature at 125° C., and then metered into the Kawaguchi reciprocating screw injection molding machine containing a screw but no mixing elements. Once cooled to 20° C., this sample was crushed with a hammer and screened. The material retained between 5 and 10 mesh screen set was added to the PP6323 polymer and mixed by hand. This sample was molded in the injection molder at 10% final carbonate loading. The pressures and temperatures for this Example 6 are shown in Table 1.

TABLE 1

| | SCREW | | TEMPERATURES | | | PRESSURES | | | |
| | RPM | NOZZLE | ZONE 3 | ZONE 2 | ZONE 1 | MOLD | INJECTION | HOLD | BACK |
|---|---|---|---|---|---|---|---|---|---|
| Example 5 | 200 | 202 | 209 | 214 | 222 | 87 | 400 | 350 | 100 |
| Example 6 | 200 | 203 | 209 | 216 | 221 | 89 | 400 | 350 | 100 |

Figure 3:
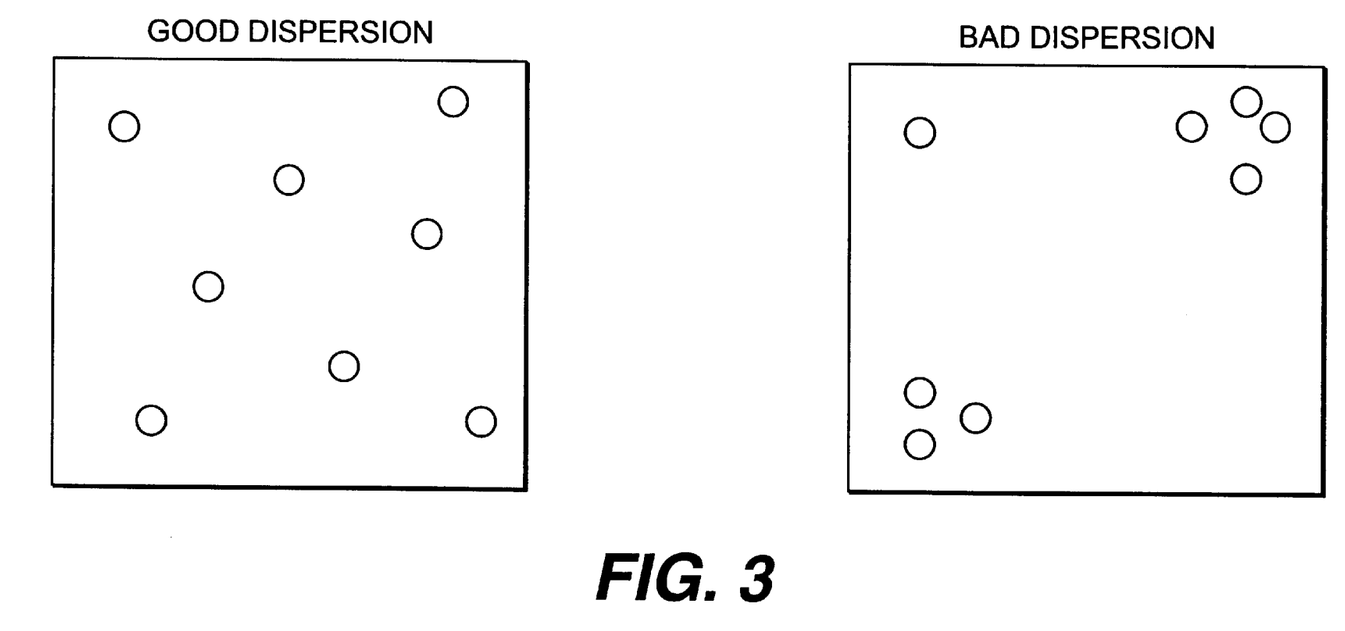
FIG. 3 is an illustration schematically showing "good dispersion" vs. "bad dispersion" of the colorant pigment system in a thermoplastic end product.

Each sample of Examples 5 and 6 was molded into impact disks and were submitted for scanning electron microscopy. Both samples showed an even dispersion of the carbonate at a microscopic level. This even dispersion can qualitatively be described as "good dispersion" in that the final end product is of uniform color, free from visible defects such as speckling, spotting, or other color discontinuities. This "good dispersion" at a microscopic level can be diagrammatically shown in FIG. 3 where "good dispersion" is compared to "bad dispersion" to the right of FIG. 3.

The impact disks of samples of Examples 5 and 6 were tested for color consistency, using CIE L*, a*, b* color measurements. CIE is an abbreviation for Commission Internationale de l'Eclarage, the international commission on illumination. The color across each molded impact disk was measured at 5 points. The average for each color indicator was calculated and used as the reference color. Each individual point was related to this average and a Delta E value calculated according to the equation below:

$$\text{Delta } E = [(L^* - L_0^*)^2 + (a^* - a_0^*)^2 + (b^* - b_0^*)^2]^{1/2}$$

where $L_0^*$, $a_0^*$, and $b_0^*$ are measured values. The L*, a*, and b* values are CIE color values that rank the whiteness, red/green and blue/yellow values spectrophotometrically by measuring the reflection of light off of a colored sample.

L* is numbered between 0 and 100, with 0 being a completely black sample and 100 being a completely white sample. The a* value is the red/green value which is a positive number for red samples (the more positive, the redder) and negative for green samples (the more negative, the greener). The b* value is similar to the a* but looks at the blue/yellow values of the material. Positive samples are yellow, negative are blue. The more positive or negative the number, the more yellow or blue, respectively. $L_o^*$, $a_o^*$, and $b_o^*$ are actual values, whereas L*, a*, and b* are base or reference values.

A Delta E value of 0.5 or higher generally indicates that there is a color variation discernible by the human eye. The results for samples 5 and 6 were as follows:

Delta E for sample 5 (without $TiO_2$)=0.48

Delta E for sample 6 (with $TiO_2$)=0.18

From this qualitative measurement, it can be said that the color is consistent.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A granule for blending with a thermoplastic end product in which said granule is to be dispersed, comprising:

85% to 92% by weight of the sum of a particulate mineral, which is coated with one or more fatty acids having a carbon chain length of from 12 to 20 carbon atoms, and a colorant pigment system;

8% to 15% by weight of said granule being a thermoplastic polymeric binder being selected from the group consisting of amorphous polyolefins, highly branched polyethylene waxes and mixtures thereof, to internally form said colorant pigment system and said particulate mineral into said granule.

2. A granule of claim 1 wherein the ratio of particulate mineral:colorant pigment system:binder is about 75:15:10.

3. A granule of claim 1 wherein the ratio of mineral:colorant pigment system:binder is about 0.1:89.9:10.

4. A granule of claim 1 wherein the particle size distribution of said mineral and said colorant pigment system is in accordance with the particle packing equation:

$$\text{Cumulative Percent finer than } D = \frac{(D^n - D_s^n)}{(D_L^n - D_s^n)} \times 100\%$$

where
   D=particle size
   $D_S$=smallest particle size
   $D_L$=largest particle size
   n=distribution module.

5. A granule of claim 4 wherein $D_L$ is in the range of 100 to 1.0 micron; $D_S$ is in the range of 10 to 0.1 micron; and n has a value appropriate for said particulate mineral and said colorant pigment particles assumed to be approximately spherical.

6. A granule of claim 1 wherein said colorant pigment system is selected from the group consisting of organic pigments inorganic pigments, and mixtures thereof.

7. A granule of claim 6 wherein said organic pigment is selected from the group consisting of chinaphtalones, monoazo calcium toners, disazocondensation products, diarylide yellows, isoindolinones, monoazo products, disazo products, benzimidazonlones, anthrachinones, disazopyrazolones, perinones, monoazonaphthol AS, disazocondensation produces, perylenes, B-naphthol, chinachridones, thioindigo's, dioxazines, indathrones, phthalocyanine compounds and mixtures thereof.

8. A granule of claim 6 wherein said inorganic pigment is selected from the group consisting of titanium dioxides, cadmium sufoselenides, cadmium mercury, natural and synthetic iron oxides, ultramarine violet, manganese violet, cobalt violet, cadmium sulphides, lead chromates, calcined metallic oxides, ferriferrocyanides, ultramarine blues, chrome orange, and mixtures thereof.

9. A granule of claim 1 wherein said colorant pigment system is present in said granule in the range of about 2% to about 4% by weight of said granule.

10. A granule of claim 1 wherein said mineral is a carbonate.

11. A granule of claim 10 wherein said carbonate is calcium carbonate.

12. A granule for blending with an end product thermoplastic in which said granule is to be dispersed, comprising:

at least 85% by weight of a colorant pigment system;

the balance of said granule by weight being a thermoplastic polymeric binder being selected from the group consisting of amorphous polyolefins, highly branched polyethylene waxes and mixtures thereof to internally form said colorant pigment system into said granule.

13. A granule of claim 12 wherein said colorant pigment system is present in a range of 85 to 92% by weight of said granule.

14. A granule of claim 12 wherein the particle size distribution of said colorant pigment system is in accordance with the particle packing equation:

$$\text{Cumulative Percent finer than } D = \frac{(D^n - D_s^n)}{(D_L^n - D_s^n)} \times 100\%$$

where
   D=particle size
   $D_S$=smallest particle size
   $D_L$=largest particle size
   n=distribution module.

15. A granule of claim 4 wherein $D_L$ is in the range of 100 to 1.0 micron; $D_S$ is in the range of 10 to 0.1 micron; and n has a value appropriate for colorant pigment particles assumed to be approximately spherical.

16. A granule of claim 12 wherein said colorant pigment system is selected from the group consisting of organic pigments inorganic pigments, and mixtures thereof.

17. A granule of claim 16 wherein said organic pigment is selected from the group consisting of chinaphtalones, monoazo calcium toners, disazocondensation products, diarylide yellows, isoindolinones, monoazo products, disazo products, benzimidazolones, anthrachinones, disazopyrazolones, perinones, monoazonaphthol AS, disazocondensation products, perylenes, B-naphthol, chinachridones, thioindigo's, dioxazines, indathrones, phthalocyanine compounds, and mixtures thereof.

18. A granule of claim 16 wherein said inorganic pigment is selected from the group consisting of titanium dioxides, cadmium sulfoselenides, cadmium mercury, natural and synthetic iron oxides, ultramarine violet, manganese violet, cobalt violet, dacmium sulphides, lead chromates, calcined metallic oxides, ferriferrocyanides, ultramine bules, chrome orange, and mixtures thereof.

19. A granule of claim 12 wherein said colorant pigment system is present in said granule in the range of about 2% to about 4% by weight of said granule.

* * * * *